United States Patent [19]

Tsukakoshi

[11] Patent Number: 5,729,747
[45] Date of Patent: Mar. 17, 1998

[54] DESIGN METHOD AND APPARATUS OF COMPUTER PROGRAM FOR BUSINESS PROCESSING

[75] Inventor: Toshiharu Tsukakoshi, Kawasaki, Japan

[73] Assignee: Hitachi, Ltd., Tokyo, Japan

[21] Appl. No.: 402,302

[22] Filed: Mar. 10, 1995

Related U.S. Application Data

[63] Continuation of Ser. No. 29,599, Mar. 11, 1993, Pat. No. 5,414,847.

[30] Foreign Application Priority Data

Mar. 13, 1992 [JP] Japan ................... 4-054654

[51] Int. Cl.⁶ ........................... G06F 9/44
[52] U.S. Cl. ........................... 395/702
[58] Field of Search ................... 395/701, 702

[56] References Cited

U.S. PATENT DOCUMENTS

| | | | |
|---|---|---|---|
| 4,831,525 | 5/1989 | Saito et al. | 395/700 |
| 4,949,253 | 8/1990 | Chigira et al. | 395/500 |
| 4,956,773 | 9/1990 | Saito et al. | 395/159 |
| 5,159,687 | 10/1992 | Richburg | 395/700 |
| 5,185,867 | 2/1993 | Ito | 395/700 X |
| 5,212,634 | 5/1993 | Washizaki et al. | 364/400 |

FOREIGN PATENT DOCUMENTS 4172529  6/1992  Japan.

OTHER PUBLICATIONS

Proceedings from the 11th annual international computer software & applications conference, 7 Oct. 1987, Tokyo Jp pp. 171–180 Harada A specification compiler for business applications: SPACE.

*Primary Examiner*—Thomas M. Heckler
*Attorney, Agent, or Firm*—Antonelli, Terry, Stout, & Kraus, LLP

[57] ABSTRACT

Without using a host computer, a computer program for object business processing is efficiently developed in a work station. A data flowchart generation unit, a system flowchart generation unit, and a program specification generation unit are provided in a distributed processor such as a work station. First of all, edit of a data flowchart of business processing which becomes the object of software development is performed. Data items extracted at this time are entered into a data item dictionary so that they may be handed over and used as input information of a data analysis unit. As for functions extracted in the edit process of the data flowchart, they are successively generated as a system flowchart and program specifications. Finally, a source program is generated.

4 Claims, 8 Drawing Sheets

F I G. 5
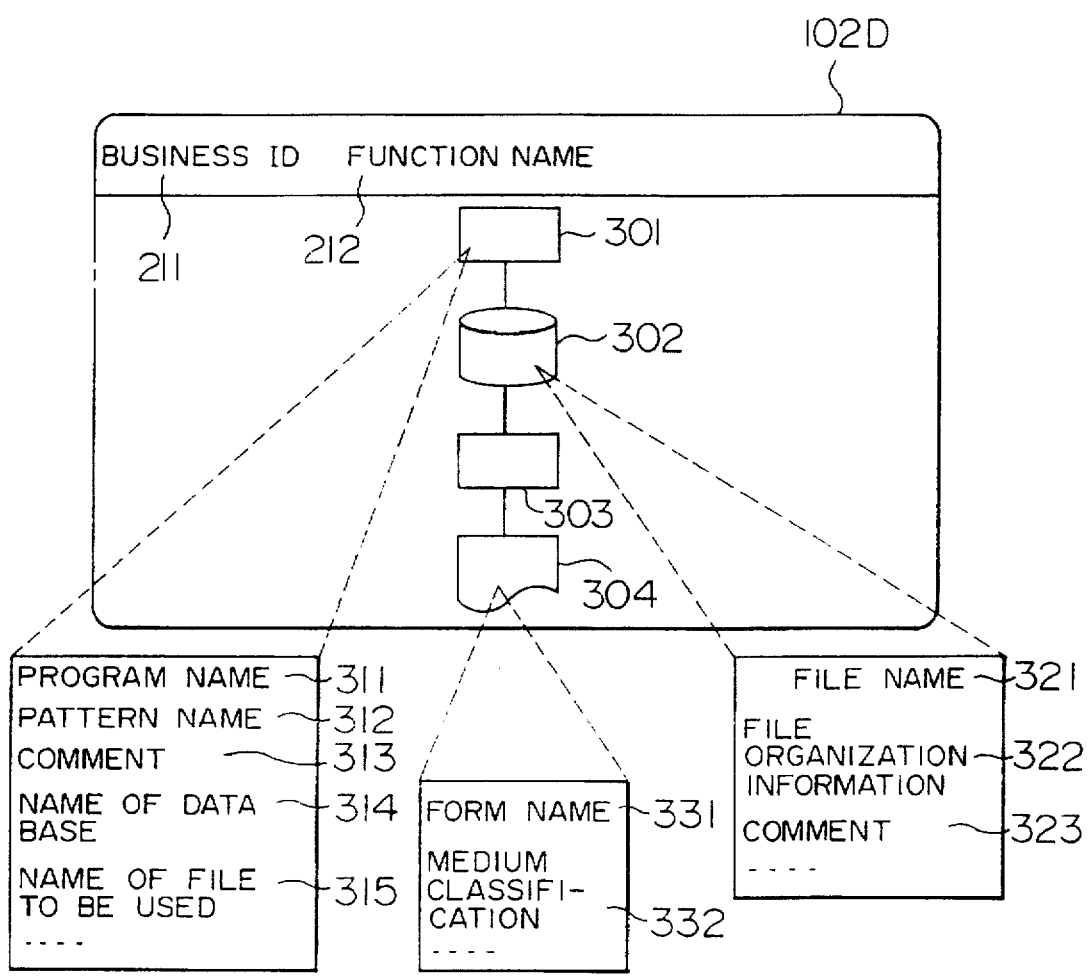

DESIGN METHOD AND APPARATUS OF COMPUTER PROGRAM FOR BUSINESS PROCESSING

This application is a continuation of Ser. No. 08/029,599, filed Mar. 11, 1993, U.S. Pat. No. 5,414,847.

BACKGROUND OF THE INVENTION

The present invention relates to a method and apparatus for designing a computer program for business processing without the intervention of a host computer under the support consistently given over the entire process by a distributed computer device such as a work station of a distributed processing system.

Development of a computer program for business processing is typically executed in the following procedure.

First of all, a program designer analyzes contents of object business processing throughly and investigates unit functions forming the business and data flow between those functions. Analysis such as normalization of data items is then conducted using an analysis tool. Data items are stored in a data item dictionary so that data may be utilized consistently in all stages of the ensuing development processes. Further, detailed design is performed for the processing, files, and data bases required for unit functions. Further, specifications of a program for implementing necessary processing are clarified, and a source program is produced on the basis of the specifications.

Conventionally, there has been a development support tool for supporting the development of such software, i.e., a program, representing the development object business in the form of a drawing, and advancing the processing in an interactive manner. There also has been a development support tool for representing the processing, files, and data bases required for necessary functions in the form of a drawing and for defining them in an interactive manner.

The development support tools individually support respective processes of the above described software development. They accurately represent the intentions of the program designer by visually representing processing and specifications required for the object business, serve to exclude the redundancy of data items and maintain the consistency thereof. Thus they contribute to improvement of software productivity.

In U.S. Pat. No. 5,185,867 issued to Kishio Ito on Feb. 9, 1993, a method and an apparatus for automatically generating software specifications relating to the technical field of the present invention are disclosed.

Conventional development support tools for business processing program will now be described.

Software production techniques are disclosed in "HITACHI REVIEW", Vol. 68, May 1986, No. 5, Serial No. 772, pp. 29–42 and "HITACHI REVIEW", Vol. 70, Feb. 1987, No. 2, Serial No. 793, pp. 7–14. The Automatic programming systems are disclosed in Japanese Patent Applications Serial No. 2-299697 filed on Nov. 7, 1990 No. 3-270713 filed on Oct. 18, 1991 and No. 3-325380 filed on Nov. 13, 1991.

Conventional development support tools had individual support functions. In case the entire program was to be designed in a distributed processing computer system, therefore, a development support tool on the host computer side was separated from a development support tool on the work station. Consequently, the program was designed while data was being transferred between the host computer and the work station. In the conventional program design, data transfer processing frequently occurred between the host computer and the work station, and the load of the host computer became excessively large, resulting in a hindrance to other business. Or, to the contrary, processing had to be advanced according to the business plan of the host computer, and hence the development work could not be conducted efficiently. The conventional program design had these problems.

Further, program development goes through respective processes so that a preceding process may be continued to its succeeding process. In the above described conventional development support tool, however, a troublesome procedure is required to successively hand over definition information defined in a certain process to the next process. In addition, smooth transfer to the work of the next process was not considered. This resulted in a problem that development work could not be advanced efficiently.

Further, data items extracted on the basis of analysis of the object business could not be used as the input of data analysis as they were. This resulted in a problem that efficient arrangement of data items in conformity with analysis of actual business could not be conducted.

SUMMARY OF THE INVENTION

A first object of the present invention is to provide a program design method and apparatus capable of successively handing over definition information between processes, from a preceding process to its succeeding process and consistently conducting development of a program using a distributed computer independent of a host computer.

A second object is to make it possible to adopt data items, extracted by the analysis of the actual business, as input of data analysis without modifying them and develop a program consistently on the basis of it.

A computer program design method according to the present invention for achieving the above described objects includes the steps of producing definition of a plurality of unit functions forming desired business processing and a data flowchart between the unit functions on the basis of data concerning business processing input to a distributed computer by an operator; producing a system flowchart on the basis of the data flowchart using a system flow generation tool possessed by the computer; producing program specifications on the basis of the system flowchart using a program specification generation tool possessed by the computer; extracting a data item on the basis of the data flowchart using a data analysis tool possessed by the computer and of storing the data item in a storage device; and producing a source program for the business processing, on the basis of the data items obtained from the storage device and the program specifications, using a source program generation tool possessed the computer.

Further, a distributed computer device for supporting design of a computer program for business processing according to the present invention includes a unit for receiving data concerning business processing input by an operator and for producing definition of a plurality of unit functions forming business processing and a data flowchart between the unit functions; a system flow generation tool unit for producing a system flowchart on the basis of the data flowchart; a program specification generation tool unit for producing program specifications on the basis of the system flowchart; a data analysis tool unit for extracting a data item on the basis of the data flowchart; a storage device for storing the data item; and a source program generation tool unit for producing a source program for business processing on the basis of the data item obtained from the storage device and the program specifications.

In accordance with the present invention, a processing program of an object business is developed in a distributed processor such as a work station independently of a host computer. Definition information between processes can be successively and smoothly handed over from a preceding process to its succeeding process. Program development can be conducted consistently.

Further, only data items extracted in conformity with object business can be analyzed efficiently. By eliminating redundant work concerning data analysis, program production in conformity with object business becomes possible.

As a result, there is generated an environment in which consistent program production can be efficiently conducted. System development capable of coping with a backlog increase caused by the upscaling of a system and a lack of workers becomes possible.

BRIEF DESCRIPTION OF THE DRAWINGS

FIG. 5 is a system flowchart;

DESCRIPTION OF THE PREFERRED EMBODIMENTS

The present invention will hereafter be described in detail on the basis of an illustrated embodiment.

Figure 1:
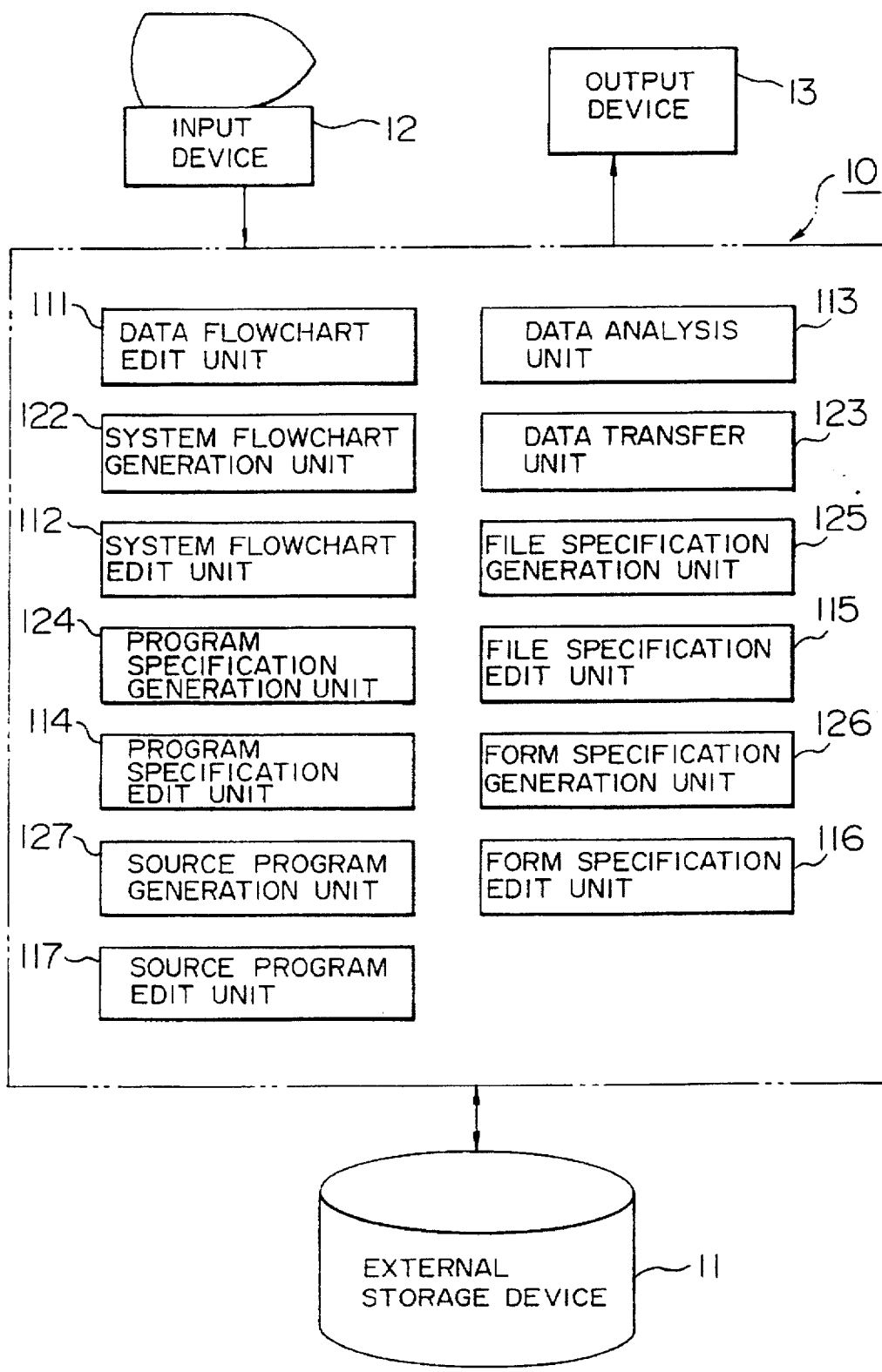
FIG 1 is a system configuration diagram of a work station for designing a business processing program according to the present invention.

FIG. 1 is a block diagram showing an embodiment of system configuration of a work station for executing a program design method according to the present invention. The work station is formed by a processor 10, an external storage device 11 including a magnetic disk device, an input device 12, and an output device 13 such as a printer.

The processor 10 includes a data flowchart edit unit 111, a system flowchart edit unit 112, a data analysis unit 113, a program specification edit unit 114, a file specification edit unit 115, a form specification edit unit 116, a source program edit unit 117, a system flowchart generation unit 122, a data transfer unit 123, a program specification generation unit 124, a file specification generation unit 125, a form specification generation unit 126, and a source program generation unit 127.

Figure 2:
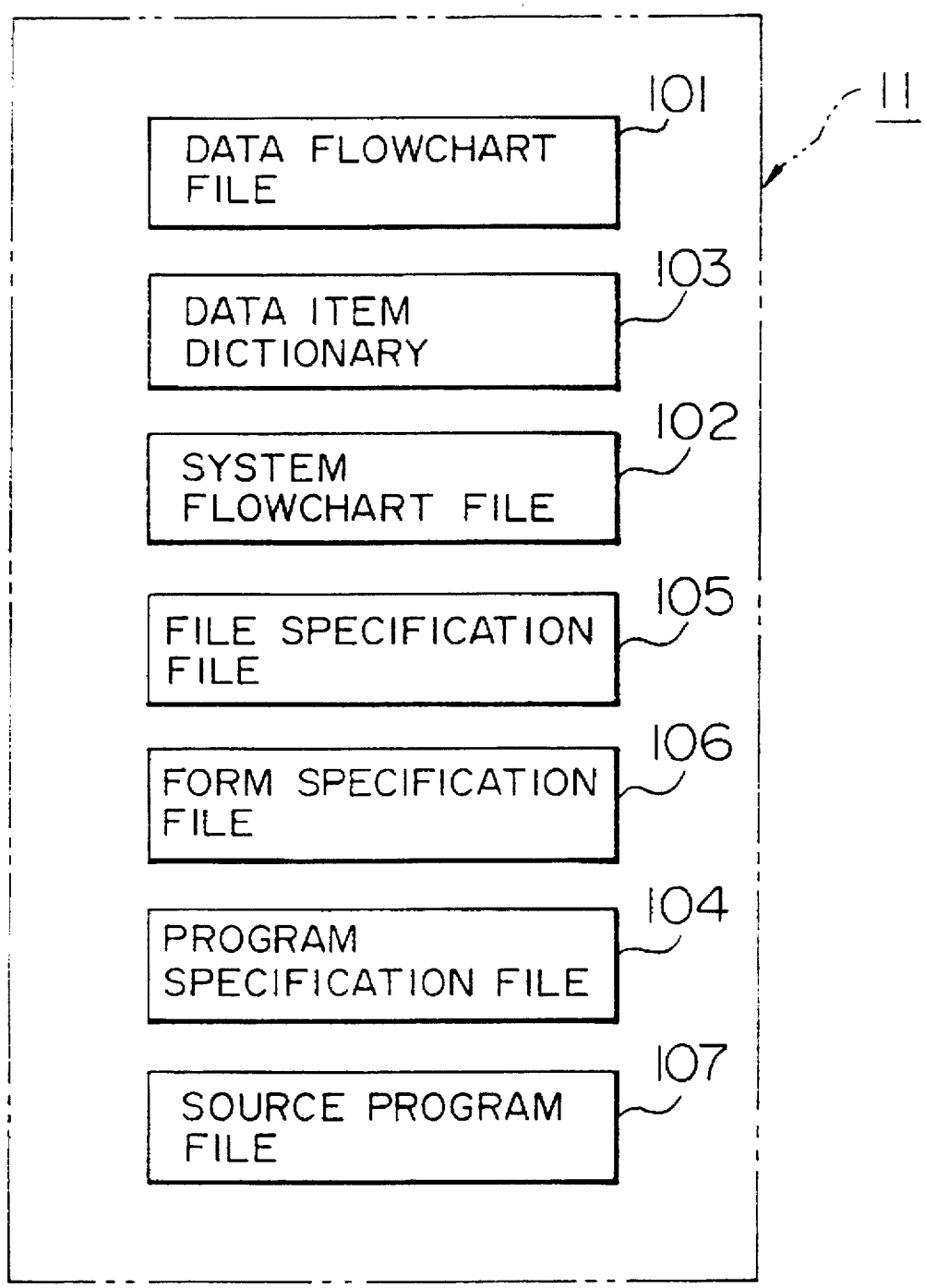
FIG. 2 is a diagram showing contents of an external storage device connected to the work station.

Further, the external storage device, as shown in FIG. 2, includes a data flowchart file 101, a system flowchart file 102, a data item dictionary 103, a program specification file 104, a file specification file 105, a form specification file 106, and a source program file 107.

In the present invention, data exchange with the host computer is unnecessary. A program for business can be designed in the work station alone which is a distributed computer.

Figure 3:
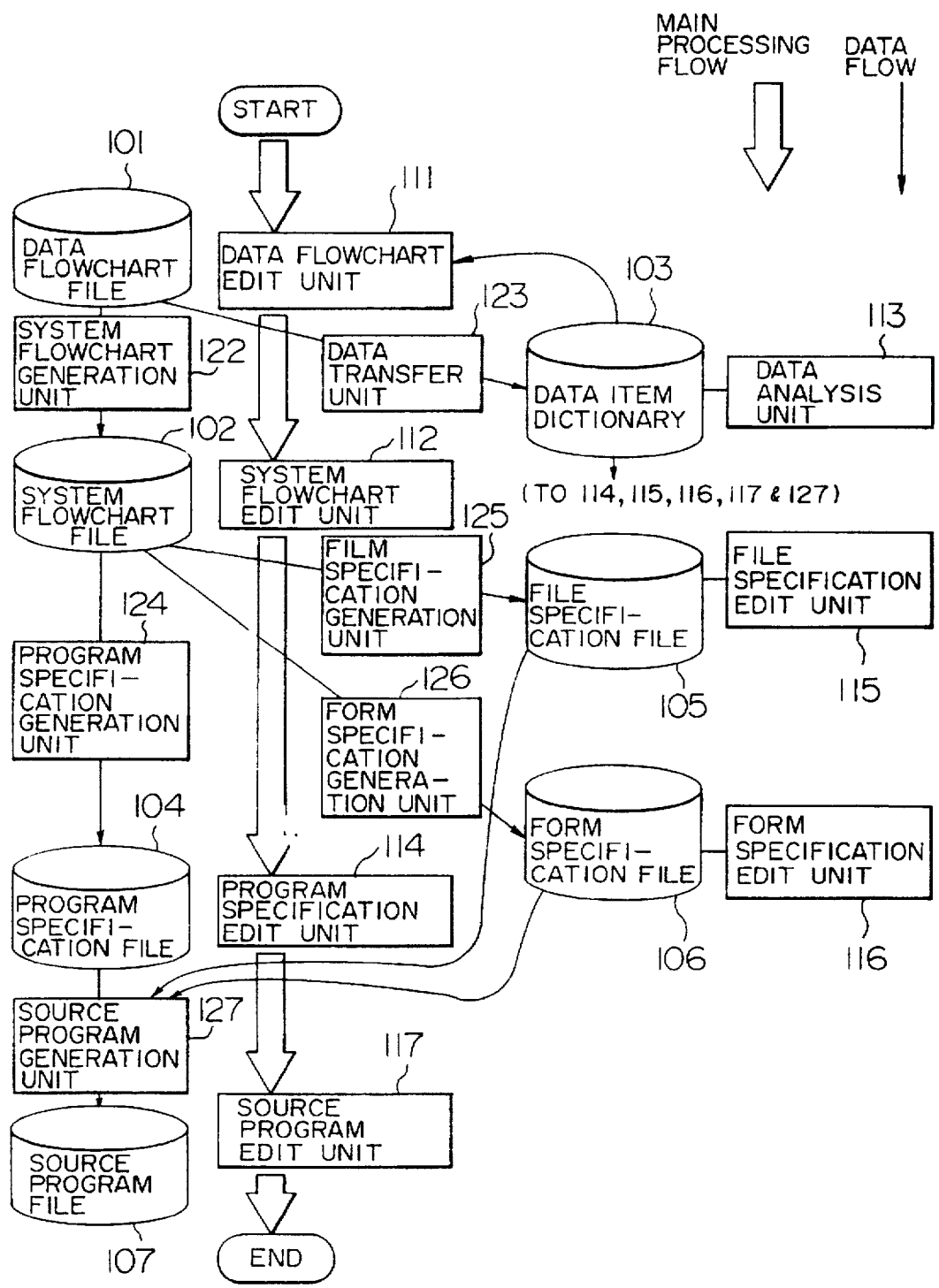
FIG. 3 shows a flowchart and a data flowchart of design of a business processing program according to the present invention.

FIG. 3 shows the flow of processing and data of consistent program production in the work station shown in FIGS. 1 and 2. The flow represented by the diagram of FIG. 3 starts from data flowchart edit for analyzing object business of software development and preparing a business design. Definition information is handed over and works of respective production processes are done. Thereafter, a source program is finally generated. The diagram of FIG. 3 represents the flow to this point. Production processes will hereafter be described one after another along the flow.

Figure 4:
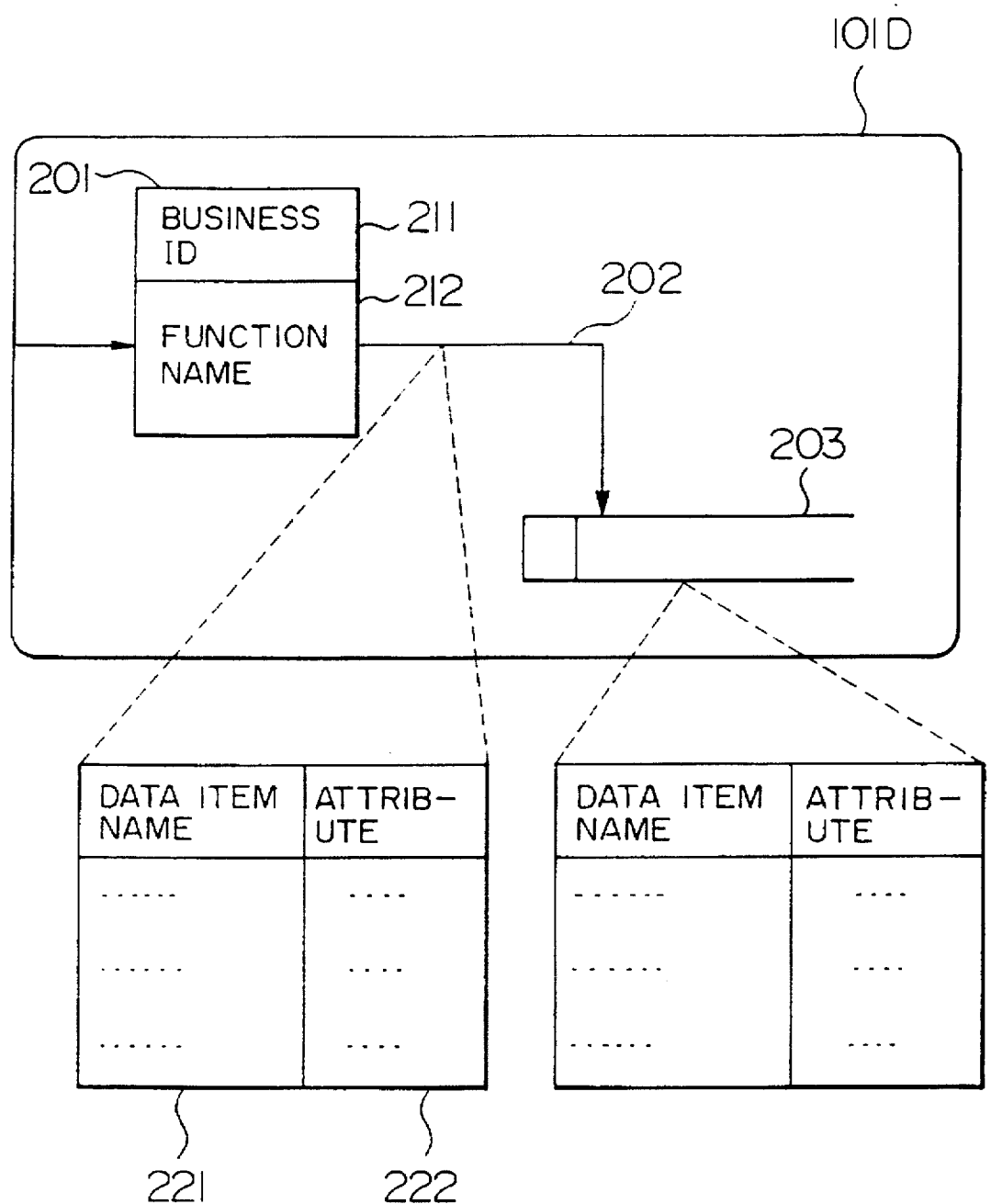
FIG. 4 is a data flowchart.

FIG. 4 shows an example of the data flowchart 101D (where D means data) for defining necessary functions and data flow between functions with respect to object business processing of software development and for designing a business processing program. A symbol 201 in this data flowchart represents one of the unit functions forming the business processing. The unit function 201 contains information such as unit business identification (ID) 211 and a function name 212. An illustrated arrow symbol 202 represents a data flow flowing between functions. The data flow 202 contains information, such as at least one data item name 221, and attributes 222, associated with respective data item names. Further, an illustrated symbol 203 represents a medium for storing data. The medium 203 contains information such as at least one data item name and attributes associated with respective data item names.

A person who edits the data flowchart 101D analyzes the contents of the object business processing. On the basis of the result of the analysis, the person defines data 221 and 222, respectively, of business ID and function name in an interactive manner by using the input device 12 and stores them in the data flowchart file 101. If in this case a completely new program is to be developed, for example, there are no data stored beforehand and hence the function name 212 and the data item name 221 are defined by inputting them each time. Furthermore, if data already stored is present in the data item dictionary 103, the data can be displayed on the screen and input to the data flowchart in an interactive manner. If at this time a data item name 221, for example, has been taken in, information such as an attribute 222 associated with that data item name 221 is also taken in automatically.

Each of the defined data item names 221 contained in data flows included in the data flowchart 101D is input to the data analysis unit 113 by the data transfer unit 123 which transfers data to the next production process. The data analysis unit 113 takes over information and exercises functions such as normalization (unification of names and unification of the number of columns) of the data item name 221. The normalized data are used to produce the data item dictionary 103.

When data is to be handed over to the next production process, its start is made by predetermined manipulation. That is, all of contained data items may be handed over in a lump by starting the data analysis unit 113 during editing of the data flowchart 101D. Alternatively, all data items contained in the data flowchart 101D may be handed over in a lump by terminating all editing of the data flowchart 101D and then starting the data analysis unit 113 with respect to the data flowchart. When data items are to be handed over to the next production process, processing is thus advanced to the data analysis unit 113 simultaneously. Thereby the worker can smoothly advance to interactive data analysis work.

As for functions which are contained in tie data flowchart 101D, internal processing for each of them must be further defined. By using the system flowchart generation unit 122 for generating the frame of specifications of the next production process which is one feature of the present invention, the business ID 211 and the function name 212 are taken over and the frame of the system flowchart 102D (a semifinished system flowchart), which contains work contents of the next production process, is automatically generated and stored in the system flowchart file 102.

In starting the system flowchart generation unit 122 in this case, the symbol 201 may be selected beforehand in the data flowchart 101D and the system flowchart generation unit 122 may be started. Alternatively, the system flowchart generation unit 122 may be started after editing of the data flowchart 101D has been terminated once and functions defined in the data flowchart may be processed in a lump.

If the frame of the system flowchart 102D has been automatically generated, processing advances to editing of the system flowchart which is the next production process.

The advance in this case may be made by predetermined manipulation. That is, the advance may be made by selecting a symbol 201 representing processing included in the data flowchart 101D and starting the system flowchart edit unit 112 with respect to the symbol. Alternatively, the frame of the system flowchart 102D automatically generated by the above described procedure may be selected after the edit of the data flowchart 101D has been finished once and the system flowchart edit unit 112 may be started with respect to the frame.

As for the method for automatically generating the frame of the system flowchart 102D, the method used in the conventional development tool can be applied thereto as it is. Therefore, its description will be omitted.

Cooperation with the host computer becomes unnecessary by thus directly advancing to generation of the frame of the system flowchart 102D by predetermined manipulation after the edit of the data flowchart 101D.

FIG. 5 shows an example of the system flowchart 102 for specifically defining processing contents with respect to one function defined in the data flowchart 101D, subdividing processing specifications of business while taking a program as the unit, and representing flow between individual programs. Strings of characters 211 and 212 included in this system flowchart 102D are respectively the business ID 211 and function name 212 handed over from the data flowchart 101D by automatic generation. Furthermore, illustrated symbols 301 and 303 are described to represent programs for implementing functions. Each of the symbols 301 and 303 contains a program name 311, a pattern name 312, a comment 313, a name 314 of a data base to be used, and a name 315 of a file to be used.

A symbol 302 is described to represent a file used as the input and output of a program. The symbol 302 contains a file name 321, a file organization information 322, and a comment 323. Furthermore, a symbol 304 is described to represent a form output by the program. The symbol 304 contains a form name 331 and a medium classification 332.

For each of the programs, files and forms included in the system flowchart 102D, a further detailed definition must be formulated. In the same way as the above described case where the system flowchart is generated for each function included in the data flowchart 101D, therefore, contained information for each of the programs, files and forms are handed over and the frame of specifications of the next production process is generated.

As for program specifications in this case, the program specification generation unit 124 for generating program specifications is used. As for file specifications, the file specification generation unit 125 for generating file specifications is used. As for form specifications, the form specification generation unit 126 for generating form specifications is used.

In using each of the generation units 124, 125 and 126, a symbol included in the system flowchart 102D may be selected and a start may be made for the symbol. Alternatively, the generation units 124, 125 and 126 may be started in a lump for the program, file and form defined in the system flowchart 102D during editing of the system flowchart, it is also possible to finish edit of the system flowchart 102D once and then make a start for the program, file and form, which have been defined in the system flowchart, in a lump.

If the program specifications 104D, the file specifications 105D, and the form specifications 106D have been generated respectively, an advance is made to respective edit units 114, 115 and 116 forming the next production process. An advance in this case can be made in the same way as the above described advance from the edit of the data flowchart 101D to the edit of the system flowchart 102D. That is to say, the advance may be made by selecting each symbol included in the system flowchart 102D and starting an edit unit associated with the symbol. Alternatively, the frame of each set of specifications automatically generated may be selected after the edit of the system flowchart 102D has been finished once and the edit unit associated with the frame may be started.

Figure 6:
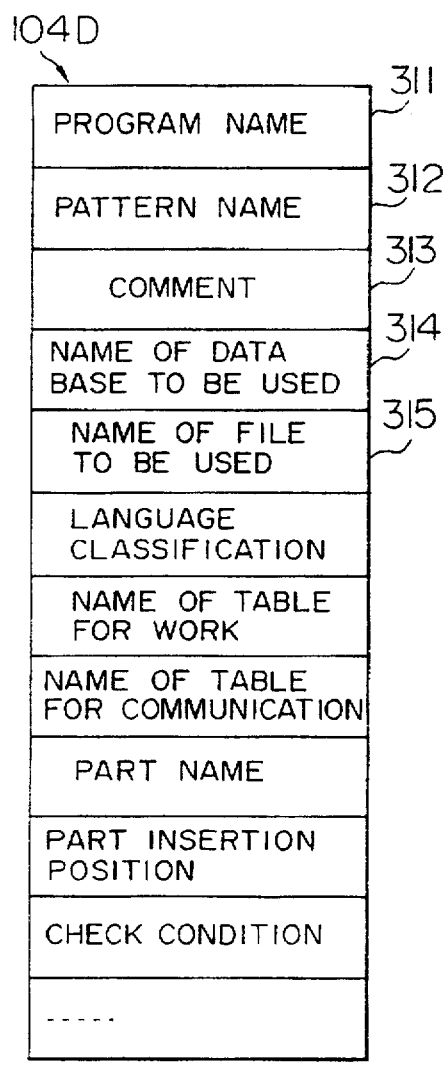
FIG. 6 shows an example of definition information defined by program specifications.

FIG. 6 shows an example of definition information, which is defined by the program specifications 104D, in the form of a table. These pieces of information are defined by the input device 12 in an interactive manner. However, some pieces of information are taken over from the system flowchart 102D which has been defined by the preceding production process. By making up for remaining information pieces, therefore, editing of the program specifications 104D is completed. As already described in the description of edit of the data flowchart 101D, information already stored in the data item dictionary 103 can be used.

In the program specifications 104D, the name of specifications containing description of specifications of the file, form, and data base concerning the program is also described.

Figure 7:
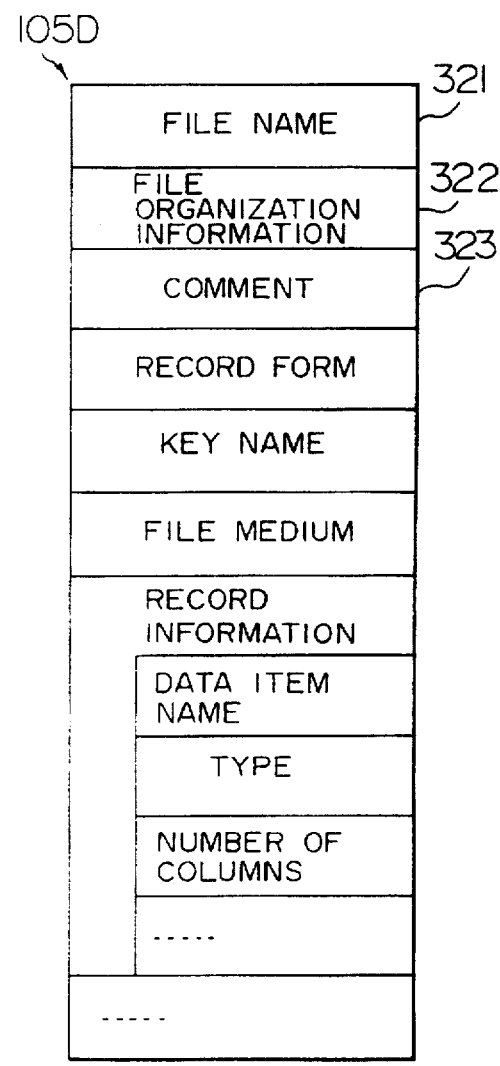
FIG. 7 shows an example of definition information defined by file specifications.

FIG. 7 shows an example of definition information, which is defined by the file specifications 105D, in the form of a table. These pieces of information are defined by the input device 12 in an interactive manner. However, some pieces of information are taken over from the system flowchart 102D which has been defined by the preceding production process. By making up for remaining information pieces, therefore, editing of the file specifications 105D is completed. As already described in the description of editing of the data flowchart 101D, information already stored in the data item dictionary 103 can be used.

Figure 8:
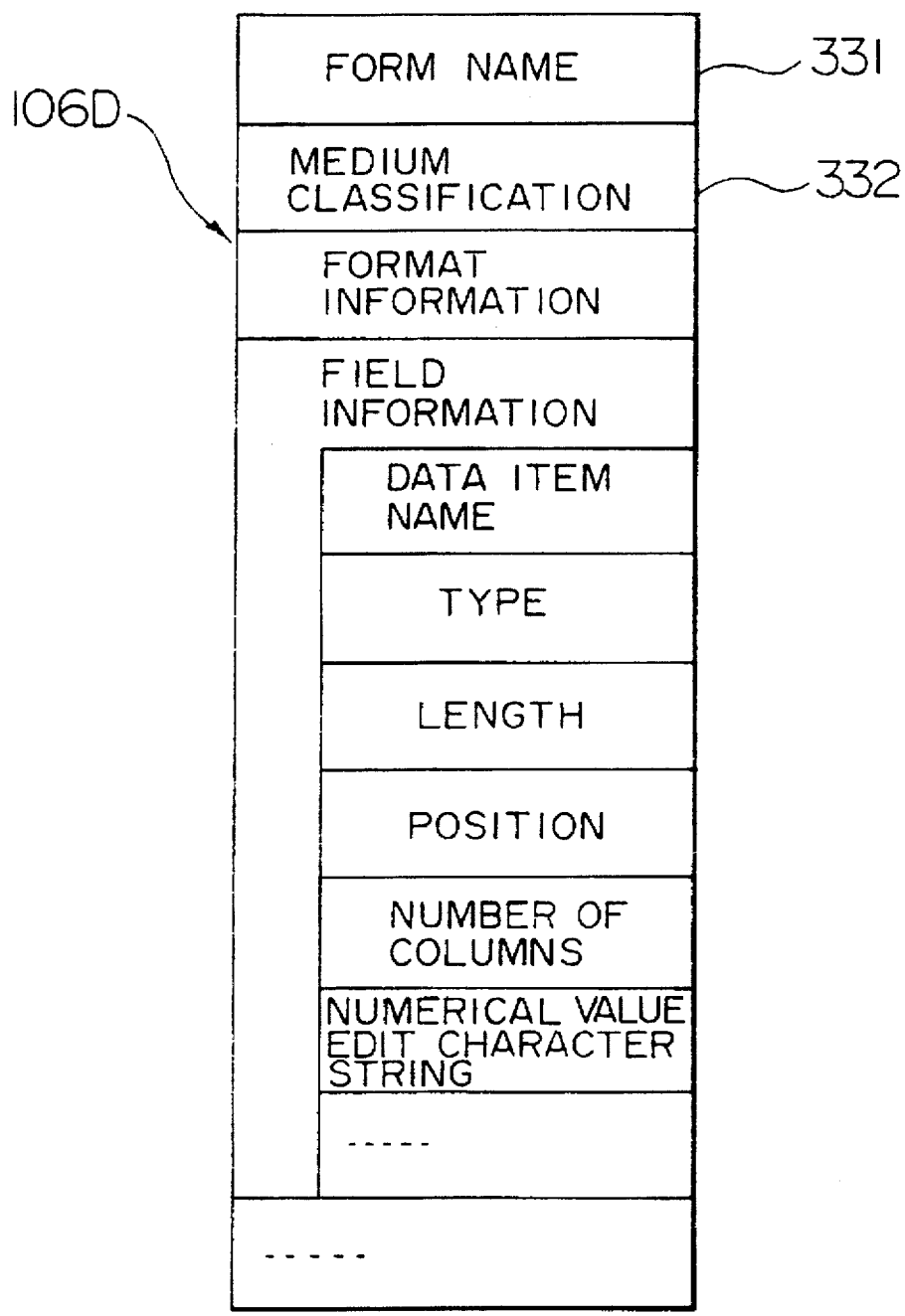
FIG. 8 shows an example of definition information defined form specifications.

FIG. 8 shows an example of definition information, which is defined by the form specifications 106D, in the form of a table. These pieces of information are defined by the input device 12 in an interactive manner. However, some pieces of information are taken over from the system flowchart 102D which has been defined by the preceding production process. By making up for remaining information pieces, therefore, editing of the form specifications 106D is completed. As already described in the description of editing of the data flowchart 101D, information already stored in the data item dictionary 103 can be used.

If definition of specifications concerning one program has thus been completed thoroughly, names of specifications concerning the program are already described in the program specifications 104D. Therefore, a source program is automatically generated by starting the source program generation unit 127 from the edit screen of the program specifications 104D, or by finishing the editing of the program specifications, then selecting that program specifications 104D, and starting the generation unit 127. That is to say, the source program generation unit 127 refers to names of specifications described in the program specifications 104D and quotes the specifications. As for names of data items contained in the specifications, the unit 127 quotes the data item dictionary 103. By thus giving body and substance to a prepared framework of the source program, the source program generation unit 127 automatically generates the required source program.

Details of processing conducted in each production process of the flowchart of FIG. 3 will now be described. First of all, the production process for generating a system flowchart 102D from the data flow chart 101D will now be described. For each of unit functions 201 in the data flowchart 101D, one system flowchart associated therewith is produced. At this time, the business ID 211 and function name 212 defined in the data flowchart 101D are used as the title of the system flowchart 102D. In the production process for generating the system flowchart 102D, a picture for interactive processing between the operator and the processor 10 is displayed on the screen of the input device 12. For example, some names of processing patterns of a certain number of different standard programs prepared beforehand are displayed on the screen. By using the input device 12, the operator specifies suitable one out of those processing patterns. Furthermore, images urging the operator to input the input file name, output file name, reference file name, and form name are displayed. By using the input device 12, the operator specifies those information pieces.

In the production process for generating file specifications 105D from the system flowchart 102D, corresponding file specifications 105D are generated for each of symbols 302 representing files included in the system flowchart 102D. A file name 321 defined in the system flowchart 102D is used as the title at the time file specifications are generated.

In the production process for generating form specifications 106D from the system flowchart 102D, a form name 331 is used in the same way as for generating file specifications.

In the production process for generating program specifications 104D from the system flowchart 102D, the following information pieces are used as definition information of program specifications. Those information pieces include the processing pattern name selected at the time of generation of the system flowchart 102D, the input file name, output file name, reference file name, and form name input at the time of generation of the system flowchart 102D, and the input file name, output file name, reference file name, and form name defined at the time of editing of the system flowchart 102D.

Figure 9:
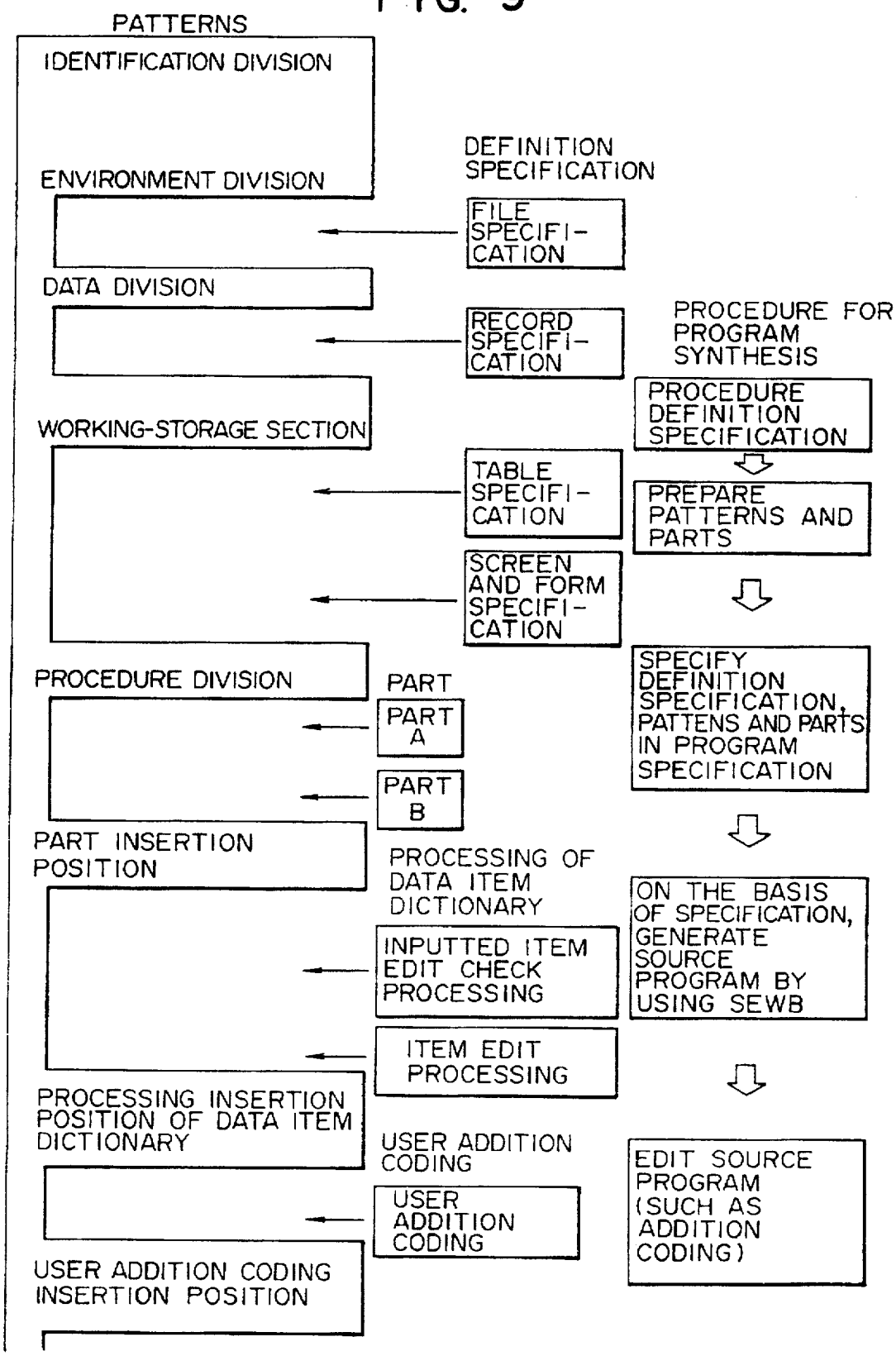
FIG. 9 is a production process drawing of synthesis processing of a source program.

In the production process for generating a source program from the program specifications 104D, file specifications 105D, and form specifications 106D, the following processing procedure is executed. On the basis of the processing pattern name defined in the program specifications 104D, framework of a source program, defined beforehand so as to be associated with the processing pattern, is called from the file 104 and displayed on the screen. On the basis of the framework, the program is constructed in an interactive manner. A data item name defined in the file specifications 105D, a data item name defined in form specifications 106D, and their attributes (position of printing, the number of columns of printing, character size, and so on) are used to generate processing statements in the source program. On the basis of the program part name defined in the program specifications 104D, a source program defined beforehand so as to be associated with the part name, is called from the file 107. Body and substance are given to the framework of the source program displayed on the screen. FIG. 9 is a production process diagram showing an example of program synthesis.

FIG. 9 shows an example of a programming pattern expressed by COBOL language. A program specification defines pattern names, part names, definition specification and so on. The COBOL program is formed with some DIVISIONs. The combinations of the DIVISIONs are previously prepared as various patterns. In production of a source program, such patterns are used as the framework of the program. A source program is completed by giving body and substance to the framework. General processes are previously defined and registered to be used in program production. The process is expressed by COBOL language in PROCEDURE DIVISION. According to the information defined in the definition specification, definition statements are produced to be effectively used in actual programming. The definition statements are disposed in predetermined positions in the patterns. The file specification is expressed by COBOL language in ENVIRONMENT DIVISION. The record specification is expressed by COBOL language in DATA DIVISION. The table, screen and form specifications are expressed by COBOL language in WORKING-STORAGE SECTION in DATA DIVISION. The processing of data item dictionary is made in a same manner as the parts. The user (a programmer with COBOL language) can additionally express the other necessary processes with the additional coding.

In accordance with the present invention as heretofore described, data flowchart generation means, system flowchart generation means, program specification generation means, and so on are provided in a distributed processor such as a work station. Functions and data items extracted through editing of the data flowchart, which analyzes object business of software development, are examined. As for functions needed for business processing consistent, there is generated such an environment that work can be advanced consistently while handing over definition data in production processes beginning from definition of the processing and ending at generation of a source program. As for data items, there is generated such an environment that the data item can be used at any time in consistent production process by handing over the data item to a data analysis unit and entering the data item in a data item dictionary. As a result, software development work can be done continuously and consistently in a distributed processor such as a work station. It thus becomes possible not only to improve the efficiency of software production, but also to consistently use data items extracted from the analysis of the object business as data items employed in respective production processes of that work. Therefore, it becomes possible to exclude the redundancy of work caused by doing separate work for extracting data items. As a result, efficient development of software fitting the purpose becomes possible.

Many different embodiment of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. A computer-implemented method for designing an application program, said method comprising the steps of:

editing a data flowchart designating a flow of data for a sequence of a plurality of processes in a data processing operation, for which said application program is designed by interactive operation on said computer by an operator, said data including names of said processes, names of data items to be input to said processes and corresponding attributes of said data items;

producing a system flowchart on the basis of said data flowchart by concatenating symbols representing programs for executing said processes and symbols representing files and forms processed in said programs in a processing sequence;

editing program specifications by further interactive operation on said computer by the operator on the basis of said system flowchart, wherein said program specifications indicate a program name, a program pattern name, input file name and output file name; and producing a source program on the basis of a program pattern designated by said program specifications and the attributes corresponding to the program pattern name.

2. A method according to claim 1, wherein when processing in one step of any one of said processes which together comprise said data processing operation is completed and is advanced to a next step of the one process, data generated in the one step advances to the next step in accordance with a predetermined order input to said computer.

3. A distributed computer device in a distributed processing system, said distributed computer device comprising:

means for receiving data, input by an operator, including names of a plurality of processes for data processing operation, names of respective data items to be input to said processes and corresponding attributes to said data items and for producing definitions for said processes and a corresponding data flowchart;

system flow generation tool means for producing a system flowchart on the basis of the data flowchart corresponding to the processes by concatenating symbols representing programs for executing said processes and symbols representing files and forms processed in said programs in a processing sequence;

programs specification generation tool means for producing program specifications which include program names, a program pattern name, an input file name and an output file name, based on said system flowchart and interactive operation by an operator;

data analysis tool means for extracting a data item from the data processing operation based on said data flowchart;

storage means for storing the extracted data item; and source program generation tool means for producing a source program for the data processing operation based on the extracted data item obtained from said storage means and the program specifications.

4. A distributed computer device according to claim 3, further comprising means for advancing one step of the data processing operation to a next step of said process, by advancing data generated in the one step to the next step in accordance with a predetermined order input to said computer.

* * * * *